United States Patent
Wöntner et al.

(10) Patent No.: US 6,394,925 B1
(45) Date of Patent: May 28, 2002

(54) HYDROSTATIC MECHANICAL TORQUE DIVIDER TRANSMISSION WITH FOUR AREAS

(75) Inventors: Gebhard Wöntner, Wolfern; Rudolf Glassner, Kottes, both of (AT)

(73) Assignee: Steyr-Daimler-Puch Aktiengesellschaft, Vienna (AT)

( * ) Notice: Subject to any disclaimer, the term of this patent is extended or adjusted under 35 U.S.C. 154(b) by 0 days.

(21) Appl. No.: 09/485,774

(22) PCT Filed: Sep. 9, 1998

(86) PCT No.: PCT/AT98/00212

§ 371 (c)(1),
(2), (4) Date: Feb. 15, 2000

(87) PCT Pub. No.: WO99/13245

PCT Pub. Date: Mar. 18, 1999

(30) Foreign Application Priority Data

Sep. 9, 1997 (AU) .............................................. 1508/97

(51) Int. Cl.⁷ ............................................. F16H 47/04
(52) U.S. Cl. ........................................................ 475/80
(58) Field of Search ......................... 475/80, 81, 82, 475/83, 72

(56) References Cited

U.S. PATENT DOCUMENTS

| | | | | |
|---|---|---|---|---|
| 4,304,151 A | * | 12/1981 | Meyerle et al. | 475/82 |
| 4,341,131 A | * | 7/1982 | Pollmann | 475/81 |
| 4,373,359 A | * | 2/1983 | Ehrlinger et al. | 475/82 |
| 4,754,664 A | * | 7/1988 | Dick | 475/81 |
| 5,080,637 A | * | 1/1992 | Tenberge et al. | 475/81 |

FOREIGN PATENT DOCUMENTS

| | | | |
|---|---|---|---|
| DE | 4106746 A1 | * | 3/1991 |
| DE | 19527754 A1 | * | 7/1995 |
| JP | 11-63154 A | * | 5/1999 |

* cited by examiner

Primary Examiner—Charles A. Marmor
Assistant Examiner—Ankur Parekh
(74) Attorney, Agent, or Firm—Bachman & LaPointe, P.C.

(57) ABSTRACT

A power-split gear consists of an adjustable hydrostatic unit (5), of a five-shaft summing gear (9) with a first, second and third output shaft, and of a range gear. So that the gear can be manufactured and controlled more easily, the range gear consists of a directly contiguous first (25) and second (26) planetary stage; the first planetary stage (25) has a sunwheel (27), a ringwheel (29) and a web (31), the sunwheel (27) being drive-connected directly to the first output shaft (21) and the ringwheel (29) being connectable to the casing (36) by means of a first clutch (34); the second planetary stage (26) has a sunwheel (28), a ringwheel (30) and a web (31), the sunwheel (28) being drive-connected directly to the second output shaft (22) and the ringwheel (30) being connectable to the casing (36) by means of a second clutch (35); the third output shaft (23) is connectable to a power take-off shaft (40) by means of a third clutch (42); the webs (31, 31) of the two planetary stages are permanently connected fixedly to one another and to the power take-off shaft (40), and the second output shaft (22) is connectable to the power take-off shaft (40) via a fourth clutch (41). A reversing gear (45) is also provided.

7 Claims, 1 Drawing Sheet

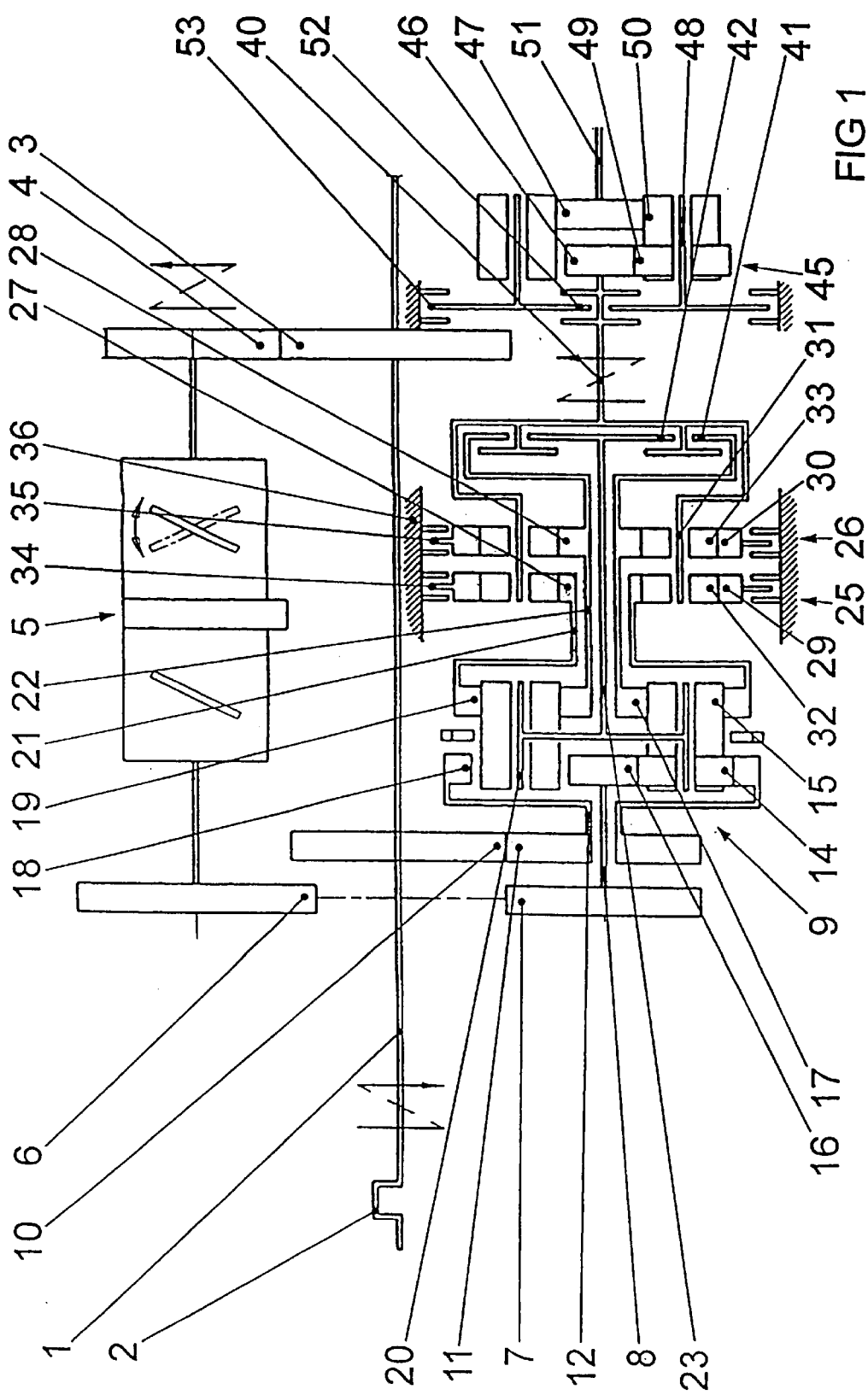

HYDROSTATIC MECHANICAL TORQUE DIVIDER TRANSMISSION WITH FOUR AREAS

BACKGROUND OF THE INVENTION

The invention is concerned with a power-split gear, consisting of an adjustable hydrostatic unit, of a five-shaft summing gear with a first, a second and a third output shaft, and of a range gear, the range shifts being carried out by the shifting of clutches.

A generic power-split gear with a five-shaft summing gear is known, for example, from FIG. 9 of DE 41 06 746 A1. Two of the three output shafts are in each case connectable to a clutch shaft via a clutch. This two clutches, and two others, between rotating parts require a supply of pressure medium via a shaft which, for this purpose, is a hollow shaft. Even six clutches are necessary altogether, thus not only increasing the design outlay, but also making the control more complicated. Moreover, the clutch shaft, in the form necessitated by its function, is unsuitable for cost-effective series production, and the ringwheel of the summing gear, said ringwheel being connected to the first clutch, is guided only by the planet wheels, this being insufficient and leading to the increased wear or poor grip of the clutch.

Another disadvantage is that the pull or rotational speed necessary for specific applications (for example, on tractors) cannot be achieved, and that the shifting time in the shuttle mode (alternately forward and backward) is too long because of the mass inertias in the range gear and because of the number of clutches involved.

It is an object of the present invention to provide a power-split gear which does not have these disadvantages and is to be capable of being produced and controlled more easily.

SUMMARY OF THE INVENTION

The foregoing object is achieved, according to the invention, wherein the range gear consists of a first planetary stage contiguous with the summing gear and of a second planetary stage, the first planetary stage has a sunwheel, a ringwheel and a web with first planet wheels, the sunwheel being drive-connected directly to the first output shaft and the ringwheel being connectable to the casing by means of a first clutch, the second planetary stage has a sunwheel, a ringwheel and a web with second planet wheels, the sunwheel being drive-connected directly to the second output shaft and the ringwheel being connectable to the casing by means of a second clutch, the third output shaft is connectable to a power take-off shaft by means of a third clutch, the web is common to the two planetary stages and is permanently connected fixedly to the power take-off shaft, and the second output shaft is connectable to the power take-off shaft via a fourth clutch.

The clutches for the two of the three output shafts of the summing gear which require a supply of pressure medium by means of the shaft are thus replaced by two clutches located downstream in the force flux, together with the spatially fixed casing. There are no longer any clutches between the summing gear and the range gear. As a result, the entire design is simplified substantially, there are fewer clutches and fewer rotary inlets for pressure medium, and there are no longer an uncentered ringwheel or parts unsuitable for series production. Due to the smaller number of clutches, the control behavior is also better and the changed arrangement allows more closely adapted range limits and therefore also more closer adaptation to extreme operating conditions.

In a particularly advantageous embodiment, the two planetary stages have identical static transmission ratios. This not only makes it possible to design a large number of parts as identical parts, but also assists in obtaining a better position of the synchronous rotational speeds for the range shifts.

The solution according to the invention is suitable for a wide variety of embodiments of the five-shaft summing gear. Various arrangements of suitable multiple planetary gears are described, for example, in DE 41 06 746. In a particularly space-saving embodiment of flexible design, the five-shaft summing gear has a web with first and second planet wheels meshing in each case with one another and also sunwheels and ringwheels meshing in each case with the first or second planet wheels, the ringwheel which meshes with the second planet wheels being connected to the first output shaft, the sunwheel which meshes with the second planet wheels being connected to the second output shaft and the web being connected to the third output shaft. A particularly simple tie-on of the sunwheels of the two planetary stages is also achieved thereby.

In an embodiment particularly suitable for the gear to be used in tractors, the power take-off shaft leads to a reversing gear. In this way, the reversing gear is connected downstream, and it may possess its own casing or share the casing with the power-split gear. In this case, the number of reverse speeds is identical to that of the forward speeds without any additional outlay in terms of construction. This affords considerable structural simplification and great advantages in the shuttle mode, particularly when the reversing gear is a planetary gear.

A particularly inexpensive and robust design of the reversing gear is achieved if it has an input sunwheel, an output sunwheel and a web with first and second planet wheels meshing with one another, the first planet wheels meshing with the input sunwheel and the second planet wheels meshing with the output sunwheel, and the web being connectable selectively to the input sunwheel via a forward clutch or to the casing via a reverse clutch. In contrast to the known planetary reversing gears, in which a ringwheel which is costly to produce is present and has to be braked, in this design it is the web that is braked; there is no ringwheel present. The planetary rotational speed is substantially lower as a result, this being beneficial to the useful life.

All the clutches used in the power-split gear according to the invention may, in principle, be of any desired type, in particular even friction clutches. However, positive clutches can be used to particular advantage in terms of control and space saving.

BRIEF DESCRIPTION OF THE DRAWINGS

The invention is described and explained below with reference to the single FIG. 1 which is a schematic representation.

DETAILED DESCRIPTION

The engine shaft 1 of a gear according to the invention is driven by an engine 2 which is indicated here as an internal combustion engine. The engine shaft drives, via gearwheels 3, 4, a hydrostatic unit 5 which consists of an adjustable and of a nonadjustable motor/pump unit and, via gearwheels 6, 7, a first input shaft 8 of a summing gear 9. The engine shaft 1 likewise drives a second input shaft 12 of the summing gear 9 via gearwheels 10, 11.

The summing gear 9 is a five-shaft planetary gear, with first planet wheels 14 and second planet wheels 15 which in each case mesh with one another, with a first sunwheel 16 on the first input shaft 8 and a second sunwheel 17, also with a first ringwheel 18 drive-connected to the gearwheel 11 and a second ringwheel 19, and finally with a web 20. An output shaft 21 is connected to the second ringwheel 19, a second output shaft 22 is connected to the second sunwheel 17 and a third output shaft 23 is connected to the web 20.

The three output shafts 21, 22, 23 are led into a range gear which consists of a first planetary stage 25 and a second planetary stage 26. There are, correspondingly, a sunwheel 27 of the first planetary stage and a sunwheel 28 of the second planetary stage, a ringwheel 29 of the first planetary stage and a ringwheel 30 of the second planetary stage, planet wheels 32 of the first stage and planet wheels 33 of the second stage and also a common web 31. The ringwheels 29 and 30 are capable of being coupled by means of a first clutch 34 or a second clutch 35 to the fixed casing 36 or to a part connected fixedly to the casing. The sunwheel 27 of the first planetary stage is connected to the first output shaft 21 of the summing gear 9 and the sunwheel 28 of the second planetary stage is connected to the second output shaft 22. The third output shaft 23 is led simply through the planetary stages.

The web 31 common to the two planetary stages 25, 26 is connected to a power take-off shaft 40 so as to form a clutch part. This clutch part belongs to a third clutch 42 and a fourth clutch 41, the second output shaft 22 being connectable to the power take-off shaft 40 by means of the fourth clutch 41 and the third output shaft 23 being connectable to the power take-off shaft by means of the third clutch 42.

The power take-off shaft 40 is also followed by a reversing gear 45. The latter consists of an input sunwheel 46, an output sunwheel 47, a web 48, first planet wheels 49, second planet wheels 50 and an end shaft 51 which leads, for example, to the axial drive, not illustrated, of a vehicle. It is therefore a planetary gear without a ringwheel. The web 48 of this reversing gear 45 is capable of being coupled either to the input sunwheel by means of a forward clutch 52 or to the casing by means of a reverse clutch 53.

The gear operates as follows: in the summing gear 9, the movement of the first input shaft has superposed on it the movement of the second input shaft 12 which is variable by means of the hydrostatic unit 5. The movement occurring at the same time can be picked off via one of the three output shafts 21, 22, 23. Pairs of these run synchronously at particular operating points, so that a shift from one range to the others can be made by the actuation of the clutches 34, 35, 41, 42. In the first range, the first clutch 34 is closed, with the result that the web 31 is driven at an even lower rotational speed than the already very slowly rotating sunwheel of the first stage 27.

A change to the second range is made by the opening of the first clutch 34 and the closing of the second clutch 35. Since the sunwheel of the second stage rotates more quickly, the web 31, and with it the power take-off shaft 40, is also moved more quickly.

A change to the third range is made by the opening of the clutch 35 and the closing of the third clutch 42. The third output shaft 23 then drives the power take-off shaft 40 directly, without one of the two planetary stages 25, 26 of the range gear being interposed.

By the opening of the third clutch 42 and the closing of the fourth clutch 41 a change is made to the fourth range in which the second output shaft 22 of the summing gear drives the power take-off shaft 40 directly.

In the following reversing gear 45, if present, either the forward clutch 52 or the reverse clutch 53 is closed. In the first case, the web 48 is connected fixedly to the input sunwheel 46, so that the gear rotates as a block and therefore without any friction. When a changeover to reverse travel is to be made in the shuttle mode, the forward clutch 52 is opened and the reverse clutch 53 closed. The web 48 is thereby stopped, and only the inertia of the web together with its planet wheels 49, 50 has to be overcome in the gear. The end shaft 51 rotates at the same rotational speed in the opposite direction of rotation.

What is claimed is:

1. A power-split gear, consisting of an adjustable hydrostatic unit (5), of a five-shaft summing gear (9) with a first (21), a second (22) and a third (23) output shaft, and of a range gear, the range shifts being carried out by the shifting of clutches, wherein a) the range gear (25, 26) consists of a first planetary stage (25) contiguous with the summing gear (9), and of a second planetary stage (26)

b) the first planetary stage (25) has a sunwheel (27), a ringwheel (29) and a web (31) with first planet wheels (32), the sunwheel (27) being drive-connected directly to the first output shaft (21) and the ringwheel (29) being connectable to the casing (36) by means of a first clutch (34), c) the second planetary stage (26) has a sunwheel (28), a ringwheel (30) and a web (31) with second planet wheels (33), the sunwheel (28) being drive-connected directly to the second output shaft (22) and the ringwheel (30) being connectable to the casing (36) by means of a second clutch (35), d) the third output shaft (23) is connectable to a power take-off shaft (40) by means of a third clutch (41), e) the web (31) is common to the two planetary stages (25, 26) and is permanently connected fixedly to the power take-off shaft (40), and f) the second output shaft (22) is connectable to the power take-off shaft (40) via a fourth clutch (42).

2. The power-split gear as claimed in claim 1, wherein the planetary stages (25, 26) have identical static transmission ratios.

3. The power-split gear as claimed in claim 1, wherein the five-shaft summing gear (9) has a web (20) with first (14) and second (15) planet wheels (14, 15) meshing in each case with one another and also first and second sunwheels (16, 17) meshing in each case with the first or second planet wheels (14, 15) and first and second ringwheels (18, 19), the second ringwheel (19) which meshes with the second planet wheels (15) being connected to the first output shaft (21), the second sunwheel (17) which meshes with the second planet wheels (15) being connected to the second output shaft (22) and the web (20) being connected to the third output shaft (23).

4. The power-split gear as claimed in claim 1, wherein the power take-off shaft (40) leads to a reversing gear (45).

5. The power-split gear as claimed in claim 4, wherein the reversing gear (45) is a planetary gear.

6. The power-split gear as claimed in claim 5, wherein the reversing gear (45) has an input sunwheel (46), an output sunwheel (47) and a web (48) with first and second planet wheels (49, 50) meshing with one another, the first planet wheels (49) meshing with the input sunwheel (46) and the second plant wheels (50) meshing with the output sunwheel (47), and the web (48) being connectable selectively to the input sunwheel via a forward clutch (52) or to the casing (36) via a reverse clutch (53).

7. The power-split gear as claimed in claim 1, wherein the clutches (34, 35, 41, 42) are positive clutches.

* * * * *